Figure 1:
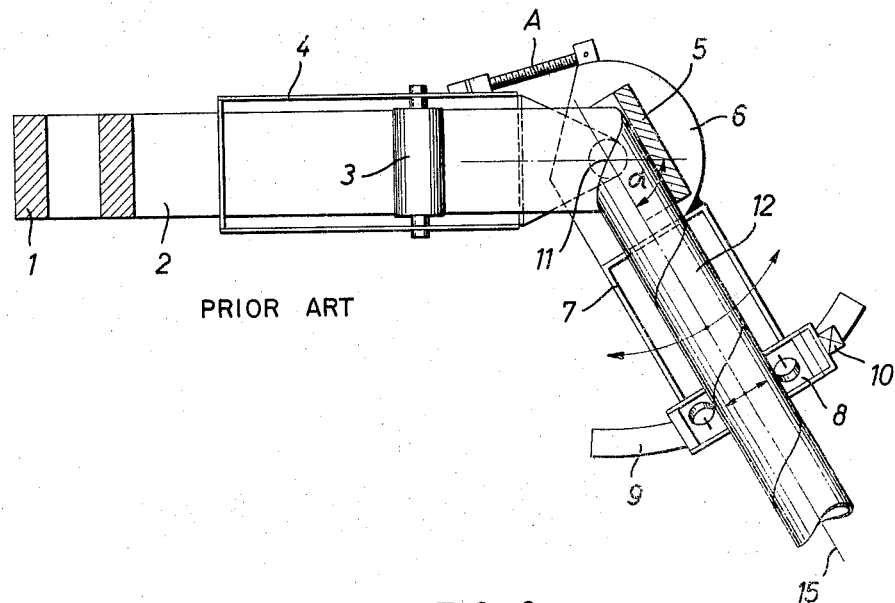

Oct. 12, 1965  K. E. SENGEL  3,210,980
HELICAL-SEAM TUBE-MAKING INSTALLATION
Filed Sept. 19, 1962  2 Sheets-Sheet 1

INVENTOR
KURT E. SENGEL
BY: Dicke & Craig
ATTORNEYS

Oct. 12, 1965 K. E. SENGEL 3,210,980
HELICAL-SEAM TUBE-MAKING INSTALLATION
Filed Sept. 19, 1962 2 Sheets-Sheet 2
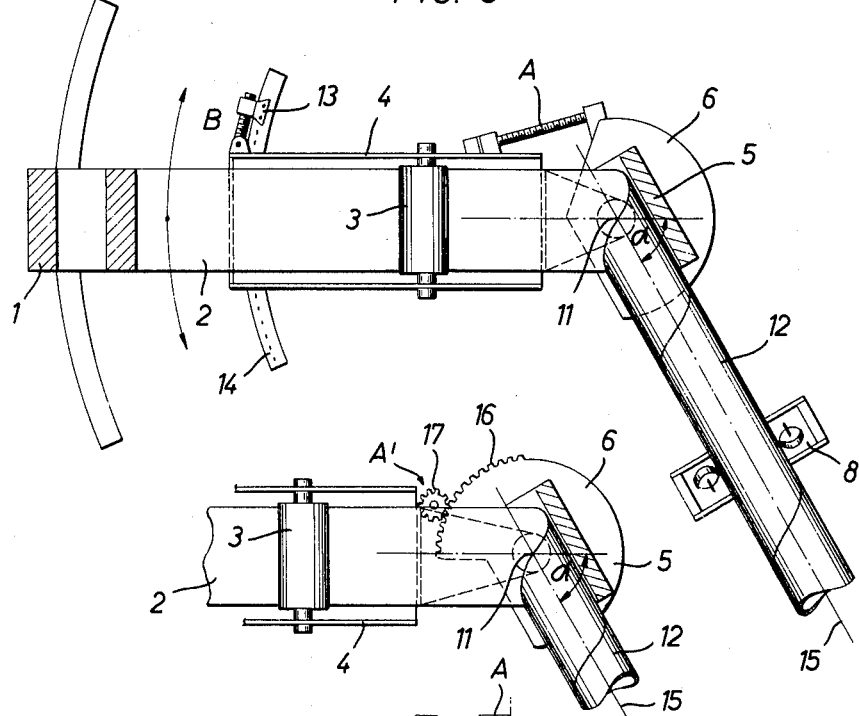
FIG. 3
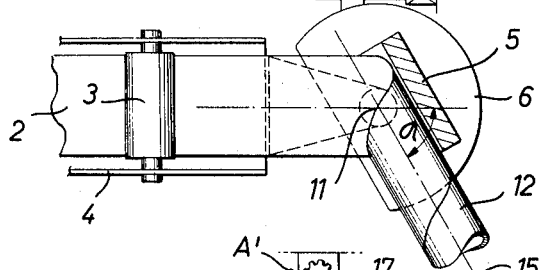
FIG. 4
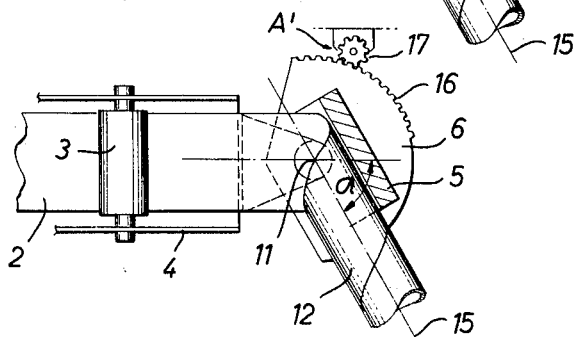
FIG. 5
FIG. 6
INVENTOR
KURT E. SENGEL
BY: Dicke & Craig
ATTORNEYS

United States Patent Office 3,210,980
Patented Oct. 12, 1965

3,210,980
HELICAL-SEAM TUBE-MAKING INSTALLATION
Kurt E. Sengel, Friedrichshafen, Germany, assignor to
Driam S.A., Vaduz, Liechtenstein, Germany
Filed Sept. 19, 1962, Ser. No. 224,770
Claims priority, application Germany, Sept. 21, 1961,
D 37,088
8 Claims. (Cl. 72—135)

The present invention relates to a helical-seam tube-making installation in which, during manufacture of the tubing, there are changeable both the angle between the direction of feeding or supply of the metallic band or sheeting and the line determined by the center points of curvature of the concave surface of the forming tool—to be referred to hereinafter as working tool axis—and the angle between this line and the longitudinal axis of the welded tubing.

The known helical-seam tube-making installations consist in general of a supply mechanism or feeding device, a forming tool, and a support carrying the welded tubing which is constituted, for the most part, as steady-rest. The metallic band or strip to be deformed is pressed into the forming tool by the supply mechanism or feeding device and by a guide channel under an angle α dependent on the width of the band and the diameter of the tubing to be manufactured; the thus supplied band is deformed in the forming tool and the mutually-contacting band edges are then welded with one another. The helical-seam tube is thereupon supported on the steady-rest.

In the known prior art arrangements, the support or steady-rest is adjustable transversely to the work tool axis in order to enable accurate adjustment of the width of the welding gap.

In one group of pipe- or tube-manufacturing installations, the supply mechanism or feeding device is stationary, whereas the forming tool, arranged on a swivel carriage or rotatable turntable, is adapted to be rotated or swung together with the steady-rest. If the supply or feeding angle α is changed, then the exit direction of the helical-seam tubing also changes, apart from the slight change which results from the auxiliary transverse adjustment of the support or the like for the precise regulation of the width of the welding gap. Consequently, a relatively wide space has to be available in the exit direction of the helical piping or tubing, which permits carrying-away or removal of the tube or pipe with the different angles α.

In another prior art group of installations for manufacturing helical tubing with welded seams, the supply mechanism or feeding device is swingable or pivotable with respect to the stationary work tool or forming tool so that, with changes of the supply angle α and with a constant width of the welding gap, the direction in which the finished seam-welded helical tubing is removed does not change. Consequently, if care has to be taken that the support for supporting the finished tube with respect to the forming tool be adapted to be adjusted in order to regulate the width of the welding gap, then difficulties will arise, particularly when the seam-welded helical tube has to be divided into partial lengths by means of a separating mechanism. Since the separating mechanisms are relatively heavy, they cannot be readily nor rapidly swung or pivoted.

The present invention is concerned with the task of constructing an installation for manufacturing seam-welded helical tubes in such a manner that the longitudinal axis of the finished tube maintains its direction also in case of changes in the supply or feeding angle α and when the width of the welding gap has to be adjusted.

As a solution to this problem, it is proposed, in accordance with the present invention, to see to it that the guide means, or the several guide means, for the welded tube are arranged in a stationary or fixed manner and that both the supply mechanism or feeding device and the forming tool are pivotally supported. For purposes of a fine or precise regulation of the supply or feeding angle and in order to enable changes in the diameter of the tubing at least with a constant width of the strip or band, or in order to enable maintaining constant the diameter of the tube with a changing width of the strip or band, it is additionally recommended, according to a further feature of the present invention, to move the supply mechanism or feeding device and a turntable carrying the work tool with the same angular velocity simultaneously but in opposite directions of rotation. The supply mechanism or feeding device and the turntable carrying the work tool are to be swung with the same angular velocity and in the same direction for purposes of a fine or precise regulation or adjustment of the width of the welding gap, or of the abutment pressure between the band edges. According to still another feature of the present invention, it is advisable to couple or operatively connect the supply mechanism or feeding device with both the rotary table carrying the work tool and with a stationary point by means, such as a tie bar, threaded spindle, toothed rack and pinion, piston and cylinder, or the like, which changes the distance between the points of connection; however, in lieu thereof, there may be arranged a toothed segment and a driving pinion meshing into the same.

Accordingly, it is an object of the present invention to provide a manufacturing installation for seam-welded helical tubes which eliminates the shortcomings and drawbacks encountered in the prior art constructions in an effective manner.

Another object of the present invention is the provision of an installation for manufacturing seam-welded helical tubes or pipes from metallic strip or band material which is simple in construction, reliable in operation, and permits ready adjustment of the installation without entailing movements or adjustments of heavy parts.

Still another object of the present invention resides in the provision of a manufacturing installation for making seam-welded helical tubes which permits ready and rapid changes in both the width of the welding gap and the angle of supply.

Figure 2:
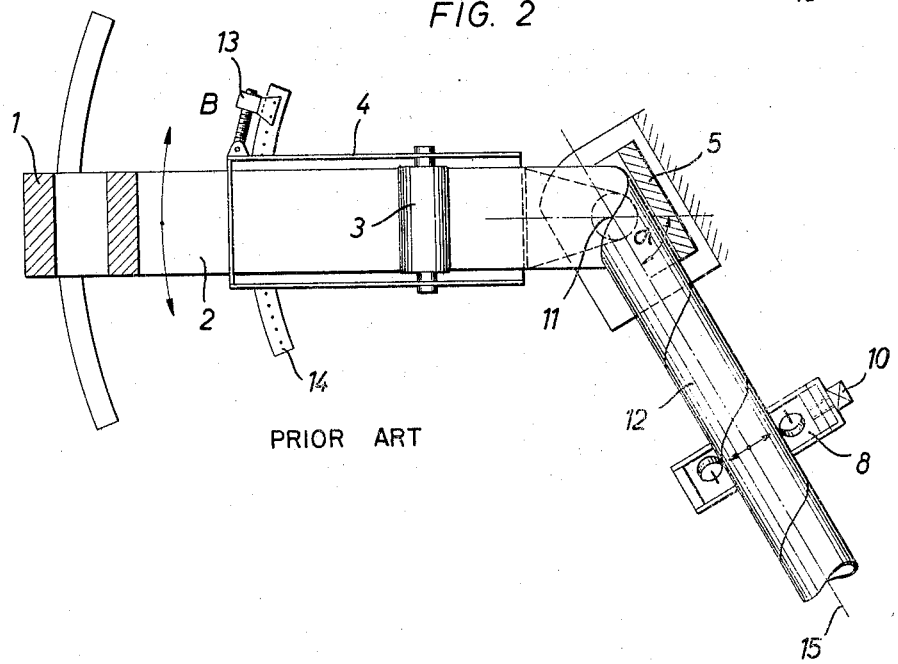

These and other objects, features and advantages of the present invention will become more obvious from the following description when taken in connection with the accompanying drawing which shows, for purposes of illustration only, several embodiments in accordance with the present invention, and wherein FIGURE 1 is a somewhat schematic plan view of one type of prior art installation for manufacturing seam-welded helical tubes in which the supply mechanism or feeding device is arranged in a fixed manner, whereas the work tool is arranged in a pivotable or swingable manner and the support is adjustable;

FIGURE 2 is a somewhat schematic view of a second type of prior art installation for manufacturing seam-welded helical tubes in which the supply installation or feeding device is arranged in a swingable manner and the support of which is adjustable, whereas the forming tool is arranged in a stationary or fixed manner;

FIGURE 3 is a somewhat schematic view of an installation for manufacturing seam-welded helical tubes in accordance with the present invention, in which the supply mechanism or feeding device and the work tool are arranged in a swingable manner, whereas the support is arranged in a stationary manner, this embodiment illustrating an operative connection between the work table and the supply mechanism or feeding device by means of a threaded spindle;

FIGURE 4 is a partial, somewhat schematic view, similar to FIGURE 3, of a modified embodiment of an installation for manufacturing seam-welded helical tubes in accordance with the present invention, in which the turntable carrying the work tool is pivoted with respect to the feeding device by the meshing engagement of a pinion with a toothed segment;

FIGURE 5 is a partial, somewhat schematic view, similar to FIGURE 4, of still a further modified embodiment of an installation for manufacturing seam-welded helical tubes in accordance with the present invention, in which the rotary table is adapted to be adjusted by means of a threaded spindle, and FIGURE 6 is a partial, somewhat schematic view, similar to FIGURES 4 and 5, of still another modified embodiment of an installation for manufacturing seam-welded helical tubes in accordance with the present invention provided with a toothed rim and pinion.

Referring now to the drawing wherein like reference numerals are used throughout the various views to designate like parts, and more particularly to FIGURE 1, the metallic band or strip 2 to be deformed, which is wound on a capsule 1, is supplied, by means of the driving rollers 3 of a supply mechanism or feeding device and a guide channel or duct (not illustrated), to a forming tool 5 which is secured to a turntable 6. A frame 7 is connected with the turntable 6 which frame 7 carries a support or steady-rest 8 swingable in unison therewith. The free end of frame 7 is displaceable or pivotal on a base 9. The support or steady-rest 8 is adjustable with respect to the frame 7. An adjusting installation A serves for the purpose of displacing the turntable 6 together with the frame 7, while a motor 10 serves for the purpose of displacing or adjusting the support or steady-rest 8 with respect to the frame 7. If the supply or feed angle α has to be changed, then the adjusting mechanism A is actuated. Upon actuation thereof, the adjusting mechanism A displaces the turntable 6 together with the frame 7 with respect to the supply mechanism or feeding device. If the gap width is intended to be changed, then the support or steady-rest 8 is adjusted with respect to the frame 7. Consequently, two adjusting mechanisms are provided in this embodiment, namely mechanisms A and 10.

In the second known installation for manufacturing seam-welded helical tubes, as illustrated in FIGURE 2, the forming tool 5 is arranged in a stationary or fixed manner, whereas the supply mechanism or feeding device 4 is adapted to pivot about an axis 11 which corresponds to the swinging or pivot axis of the forming tool 5 of FIGURE 1. An adjusting mechanism B serves for the purpose of pivotally displacing the supply mechanism or feeding device for purposes of changing the supply or feed angle α. In order to adapt the width of the welding gap to the prevailing requirements, the support or steady-rest 8 is adjustable with respect to the forming tool 5, approximately in the same manner as is the case in FIGURE 1 by the control of motor 10. In that case, the exit direction or direction of removal of the seam-welded helical tube 12 changes as a result of the fine adjustment of the width of the welding seam which, exactly in the same manner as in the case of the helical-seam tube-making installation of FIGURE 1, renders a movement of the separating installation necessary. If the supply or feed angle α has to be changed by a relatively large amount, then the relatively fixed part 13 of the adjusting mechanism B may be displaced on a segmental cam track 14 so that the adjusting mechanism B is utilizable both for small and for large changes in the angle α.

FIGURE 3 illustrates a manufacturing installation for making seam-welded helical tubes in accordance with the present invention which comprises both the adjusting mechanism A of FIGURE 1 as well as the adjusting mechanism B of FIGURE 2. The supply mechanism or feeding device 4 and the turntable 6 with the tool 5 are pivotal or swingable, whereas the support or steady-rest 8 is arranged in a fixed or stationary manner.

*Operation*

The operation of the installation of FIGURE 3 is as follows:

If the manufacturing installation has to be re-adjusted, for example, when tubes with a different diameter are to be manufactured, then the deforming angle α is adjusted by means of the adjusting mechanisms A and B, care being taken that the tool axis coincides with or, respectively, extends parallel to the center line of the support or steady-rest 8 depending on whether the strip to be deformed abuts at the concave surface of the work tool or only partially contacts the same during manufacture of the pipe or tube. If, during the manufacturing operation, it becomes apparent that the deforming angle α must be corrected, then the adjusting mechanism A is influenced correspondingly, and the adjusting mechanism B is actuated simultaneously and synchronously therewith in the opposite direction so that the longitudinal axis 15 of the seam-welded helical tube 12 maintains its initial direction. If the width of the welding gap is to be corrected, then only the adjusting mechanism B is actuated, which then pivots or swings the supply mechanism or feeding device 4 together with the strip or band 2 and the turntable 6. Accordingly, the supply mechanism or feeding device 4 and the tool 5 pivot thereby about the axis 11 with the same angular velocity.

Similar considerations also apply to the embodiment of FIGURE 4 in which the adjusting mechanism A of FIGURE 3 is replaced by an adjusting mechanism A'. A toothed segment 16 is arranged at the turntable 6 and the associated pinion 17 and/or the drive thereof (not illustrated) are connected with the supply mechanism or feeding device 4.

The means for actuating any of the adjusting mechanisms A, A' and B used in any embodiment of the present invention are not illustrated herein, since they are of a conventional nature and well known in connection with such types of adjusting motors.

FIGURES 5 and 6 illustrate two further embodiments in which the adjusting mechanisms A and A' of FIGURES 3 and 4 for the turntable 6 are not connected with the movable supply mechanism or feeding device 4, but instead with a relatively stationary point.

While the operation of the arrangements of FIGURES 5 and 6 differs from that of FIGURES 3 and 4, it achieves the same purpose, that is, the direction of the axis 15 of the leaving pipe or tube is maintained constant. In both cases, the deforming angle α may be corrected by actuation of the adjusting mechanism B alone.

For purposes of correcting the width of the welding gap, as also described in connection with FIGURE 3, the supply mechanism or feeding device 4 and the turntable 6 are pivoted simultaneously about the axis 11 with the same angular velocity and in the same direction.

Consequently, the three parts 4, 5 and 6 as well as 8 which are movable with respect to each other may always be so adjusted in all the embodiments in accordance with the present invention that, with any occurring corrections, the pipe 12 always leaves in the same direction.

While I have shown and described several embodiments in accordance with the present invention, it is understood that the same is not limited thereto but is susceptible of many changes and modifications within the spirit and scope of the present invention and I, therefore, do not wish to be limited to the details shown and described herein but intend to cover all such changes and modifications as are encompassed by the scope of the appended claims.

I claim:
1. An installation for manufacturing seam-welded helical tubes in which during tube manufacture the angle between the feed direction of the band material and the line determined by the center points of curvature of the concave surface of the forming tool as well as the angle between this line and the longitudinal axis of the tube is adapted to be changed, comprising forming tool means, means for feeding the band material to said forming tool means at a predetermined feed angle, guide means for the finished tube, means for relatively fixedly supporting said guide means, and means for swingably supporting said feed means and said forming tool means.

2. An installation for manufacturing seam-welded helical tubes in which during tube manufacture the angle between the feed direction of the band material and the line determined by the center points of curvature of the concave surface of the forming tool as well as the angle between this line and the longitudinal axis of the tube is adapted to be changed, comprising forming tool means, means for feeding the band material to said forming tool means at a predetermined feed angle, guide means for the finished tube, means for relatively fixedly supporting said guide means, and means for swingably supporting said feed means and said forming tool means, said forming tool means including a turntable, and fine adjusting means for selectively adjusting the feed angle including means for displacing said feed means and said turntable substantially with the same angular velocity and in opposite directions in order to enable change in the diameter of the tube with a constant width in the band material or to enable maintaining constant the diameter of the tube with a change in the width of the band material.

3. An installation for manufacturing seam-welded helical tubes in which during tube manufacture the angle between the feed direction of the band material and the line determined by the center points of curvature of the concave surface of the forming tool as well as the angle between this line and the longitudinal axis of the tube is adapted to be changed, comprising forming tool means, means for feeding the band material to said forming tool means at a predetermined feed angle, guide means for the finished tube, means for relatively fixedly supporting said guide means, and means for swingably supporting said feed means and said forming tool means, said forming tool means including a turntable, and fine adjusting means for selectively adjusting the feed angle including means for displacing said feed means and said turntable substantially with the same angular velocity and in opposite directions in order to enable change in the diameter of the tube with a constant width in the band material or to enable maintaining constant the diameter of the tube with a change in the width of the band material, and further fine adjusting means selectively swinging said feed means and said turntable with substantially the same angular velocity and in the same direction of rotation for selectively and accurately adjusting the welding gap width between the edges of the band material.

4. An installation for manufacturing seam-welded helical tubes in which during tube manufacture the angle between the feed direction of the band material and the line determined by the center points of curvature of the concave surface of the forming tool as well as the angle between this line and the longitudinal axis of the tube is adapted to be changed, comprising forming tool means including a turntable, means for feeding the band material to said forming tool means at a predetermined feed angle, guide means for the finished tube, means for relatively fixedly supporting said guide means, and means for swingably supporting said feed means and said forming tool means including two connecting means operatively connecting said feed means, on the one hand, with said turntable and, on the other, with a relatively fixed point to enable selective change in the distance therebetween.

5. An installation for manufacturing seam-welded helical tubes in which during tube manufacture the angle between the feed direction of the band material and the line determined by the center points of curvature of the concave surface of the forming tool as well as the angle between this line and the longitudinal axis of the tube is adapted to be changed, comprising forming tool means including a turntable, means for feeding the band material to said forming tool means at a predetermined feed angle, guide means for the finished tube, means for relatively fixedly supporting said guide means, and means for swingably supporting said feed means and said forming tool means including a toothed segment secured to said turntable and a driving pinion at said feed means and engaging with said toothed segment.

6. An installation for manufacturing seam-welded helical tubes in which during tube manufacture the angle between the feed direction of the band material and the line determined by the center points of curvature of the concave surface of the forming tool as well as the angle between this line and the longitudinal axis of the tube is adapted to be changed, comprising forming tool means including a turntable, means for feeding the band material to said forming tool means at a predetermined feed angle, guide means for the finished tube, means for relatively fixedly supporting said guide means, and means for swingably supporting said feed means and said forming tool means including means for finely regulating the feed angle by swinging said feed means only with respect to said turntable.

7. In an installation for manufacturing seam-welded helical tubes having feed means for supplying the tubing material, deforming tool means for deforming the tubing material supplied by the feed means, and guide means for guiding the finished tubing during removal from the installation in a predetermined direction, in which during manufacture the angle between the feed means and the line determined by the center points of curvature of the concave surfaces of the forming tool means as well as the angle between this line and the longitudinal axis of the finished tubing is adjustable, the improvement essentially consisting of means for supporting said guide means in a relatively stationary manner and swingable support means for swingably supporting said tool means and said supply means including means for selectively displacing the two parts consisting of said feed means and said deforming tool means substantially at the same speed and in opposite directions and second means for selectively displacing said two parts in the same direction and at substantially the same angular velocity.

8. An installation for manufacturing seam-welded helical tubes in which during tube manufacture the angle between the feed direction of the band material and the line determined by the center points of curvature of the concave surface of the forming tool as well as the angle between this line and the longitudinal axis of the tube is adapted to be changed, comprising forming tool means, means for feeding the band material to said forming tool means at a predetermined feed angle, guide means for the finished tube, means for relatively fixedly supporting said guide means, and means for swingably supporting said feed means and said forming tool means, and further fine adjusting means selectively swinging said feed means and said turntable with substantially the same angular velocity and in the same direction of rotation for selectively and accurately adjusting the welding gap width between edges of the band material.

References Cited by the Examiner

UNITED STATES PATENTS

| | | | |
|---|---|---|---|
| 2,038,483 | 4/36 | Ferguson et al. | 113—35 |
| 2,752,873 | 7/56 | Freeze | 113—35 |
| 3,030,488 | 4/62 | Kuckens | 113—35 |

CHARLES W. LANHAM, *Primary Examiner.*

WHITMORE A. WILTZ, *Examiner.*